(12) United States Patent
Kim

(10) Patent No.: US 8,681,262 B2
(45) Date of Patent: Mar. 25, 2014

(54) IMAGE PICKUP APPARATUS HAVING AUTO FOCUSING FUNCTION USING FRACTAL DIMENSION AND AN AUTO FOCUSING METHOD

(75) Inventor: Seoyoung Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 123 days.

(21) Appl. No.: 13/386,852

(22) PCT Filed: Jul. 21, 2010

(86) PCT No.: PCT/KR2010/004781
§ 371 (c)(1),
(2), (4) Date: Jan. 24, 2012

(87) PCT Pub. No.: WO2011/010871
PCT Pub. Date: Jan. 27, 2011

(65) Prior Publication Data
US 2012/0120276 A1 May 17, 2012

(30) Foreign Application Priority Data

Jul. 24, 2009 (KR) ........................ 10-2009-0067932

(51) Int. Cl.
*H04N 5/232* (2006.01)
(52) U.S. Cl.
USPC ....................... 348/345; 348/349; 348/208.12

(58) Field of Classification Search
None
See application file for complete search history.

(56) References Cited

U.S. PATENT DOCUMENTS

| | | | |
|---|---|---|---|
| 5,671,294 A | 9/1997 | Rogers et al. | |
| 7,257,267 B2 * | 8/2007 | Recht | 382/249 |
| 8,310,545 B2 * | 11/2012 | Fujita et al. | 348/148 |
| 2006/0008132 A1 * | 1/2006 | Recht | 382/133 |
| 2006/0045338 A1 * | 3/2006 | Recht | 382/181 |
| 2009/0052795 A1 * | 2/2009 | Recht | 382/255 |
| 2009/0074293 A1 | 3/2009 | Recht | |
| 2009/0231482 A1 * | 9/2009 | Shikata | 348/345 |
| 2009/0297055 A1 * | 12/2009 | Panda | 382/249 |

* cited by examiner

*Primary Examiner* — Twyler Haskins
*Assistant Examiner* — Wesley J Chiu
(74) *Attorney, Agent, or Firm* — Birch, Stewart, Kolasch & Birch, LLP

(57) ABSTRACT

An image pickup apparatus having auto focusing function using fractal dimension and an auto focusing method of an image pickup apparatus are disclosed, the apparatus characterized by comprising: a pickup unit; a fractal controller generating a fractal dimension value indicating chrominance information change per pixel of a pickup image of the pickup unit to determine whether the auto focusing has been adjusted; and an auto focusing adjustor adjusting a focus of the pickup unit in response to an auto focus adjustment signal from the fractal controller.

11 Claims, 3 Drawing Sheets

IMAGE PICKUP APPARATUS HAVING AUTO FOCUSING FUNCTION USING FRACTAL DIMENSION AND AN AUTO FOCUSING METHOD

TECHNICAL FIELD

The present invention relates to an image pickup apparatus, and more particularly to an image pickup apparatus having a continuous auto focusing function using fractal dimension and a continuous auto focusing method of an image pickup apparatus.

BACKGROUND ART

The conventional image pickup apparatus such as digital cameras and cameras on mobile terminals is disposed with a continuous auto focusing function automatically adjusting a focus based on movement or changes of an object. The continuous auto focusing function may be divided into two mode, i.e., a monitoring mode monitoring image changes, and a focus determining mode seeking for an optimal focus of an image.

FIG. 1 illustrates images in the focus determining mode, and images through an edge filter. The monitoring mode anticipates image changes by using a time difference in the image changes or changes of edge values of images to implement the continuous auto focusing adjustment. That is, the monitoring mode discriminates that an image to be focused has been determined to perform the auto focusing adjustment, if an image change is equal to or greater than threshold value, and this condition is continuously maintained after lapse of a predetermined frame.

The focus determining mode uses an edge filter to extract an edge strength to horizontal and vertical directions, i.e., a gradient value of the edge value, and decides a point having the highest gradient value as a focus object position. That is, if the auto focus adjustment performance by the monitoring mode is determined in the focus determining mode, the edge filter is applied as shown in FIG. 1, to extract a gradient value (or FV: Focus Value) of the edge value to the horizontal and vertical directions and to determine a point having the highest value as a focus object position.

At this time, in a case a horizontal edge value is defined as HEV, a vertical edge value is defined as VEV, and a focus value is defined as FV, the FV can be obtained by an equation of $$FV = \sqrt{HEV^2 + VEV^2}.$$

However, the conventional auto focusing method thus described has a drawback in that a time delay is generated until an object image to be focused is determined, because the focus determining mode is performed by discriminating that an image to be focused has been determined only if an edge strength of a relevant frame maintains a predetermined value or more for a predetermined period of time while an edge change of a video image is maintained at a predetermined threshold value or more in the monitoring mode.

Another drawback in the conventional auto focusing method is that the focus determining mode must be performed again if the video image is changed in the time delay generated by determination of object image to be focused, whereby unnecessary focus determining mode has to be repeatedly performed. Still another drawback in the conventional auto focusing adjustment method is that detection of image changes cannot be accurately performed based on image properties, whereby lots of time are consumed before the determination of the focus, if the image changes are measured by edge changes and stabilization time in the image monitoring mode for performing the focus determining mode.

DISCLOSURE

Technical Problem

The present invention is disclosed to solve the aforementioned drawbacks, and it is an object of the present invention to provide an image pickup apparatus having a continuous auto focusing function using fractal dimension capable of effectively monitoring image changes for image discrimination for performing a focus determining mode, and for preventing repeated performance of frequent focus determining mode, and a continuous auto focusing method of the image pickup apparatus.

Technical problems to be solved by the present invention are not restricted to the above-mentioned, and any other technical problems not mentioned so far will be clearly appreciated from the following description by skilled in the art.

Technical Solution

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided an image pickup apparatus having a continuous auto focusing function using fractal dimension, characterized by comprising: a pickup unit; a fractal controller generating a fractal dimension value indicating chrominance information change per pixel of a pickup image of the pickup unit to determine whether the auto focusing has been adjusted; and an auto focusing adjustor adjusting a focus of the pickup unit in response to an auto focus adjustment signal from the fractal controller.

In some exemplary embodiments of the present invention, the fractal controller may be characterized by including: a chrominance information extractor extracting chrominance information per pixel of pickup image of the pickup unit; a fractal dimension generator generating a fractal dimension value indicating changes in chrominance difference among the neighboring pixels; and an auto focusing adjustment determinator generating an auto focus adjustment signal to output the signal to the auto focusing adjustor if the fractal dimension value exceeds a preset threshold value.

In some exemplary embodiments of the present invention, the fractal controller may be characterized by further comprising a blocking unit blocking the pixels by a block including an N*N pixel and determining a chrominance information value having the highest value in the blocks as a chrominance value of the block and setting up the block as a new pixel.

In some exemplary embodiments of the present invention, the fractal dimension value may be a value of a sum of surface changes among pixels of histogram indicating the pixel.

In some exemplary embodiments of the present invention, the fractal dimension value may have a decimal value that is equal to or greater than 2 but smaller than 3.

In some exemplary embodiments of the present invention, the fractal dimension value may be set up as [2−{log (sum of changes in chrominance information per pixel (A (η)))/log (inclination of average value (η) of horizontal and vertical widths of a horizontal surface of the pixel)}].

In another general aspect of the present invention, an auto focusing method of an image pickup apparatus is provided, the method characterized by comprising: generating a fractal dimension value indicating changes of pixels of video images; determining whether the fractal dimension value generated in the course of generating the fractal dimension exceeds a preset threshold value; and performing a focus determining mode to determine a focus if the fractal dimension value exceeds a preset threshold value.

In some exemplary embodiments of the present invention, the step of generating the fractal dimension may be a step of detecting complexity indicating chrominance changes among neighboring pixels.

In some exemplary embodiments of the present invention, the step of generating the fractal dimension may be characterized by including: extracting chrominance information per pixel of images; and generating a fractal dimension value indicating changes of chrominance information among pixels extracted in the course of extracting the chrominance information.

In some exemplary embodiments of the present invention, the step of generating the fractal dimension may be characterized by including: extracting chrominance information per pixel of images; blocking pixels having chrominance information extracted in the course of extracting chrominance information as a block including a N*N pixel; determining a chrominance information value having the highest value in the blocks as a chrominance value of the block and setting up the block as a new pixel; and generating a fractal dimension value indicating changes per block of the chrominance information per block generated in the blocking step.

In some exemplary embodiments of the present invention, the step of extracting the chrominance information may be a step of indicating the chrominance information per pixel in a 3-axis histogram.

In some exemplary embodiments of the present invention, the fractal dimension value may be a value of a sum of surface changes among pixels of histogram indicating the pixel.

In some exemplary embodiments of the present invention, the fractal dimension value may have a decimal value that is equal to or greater than 2 but smaller than 3.

In some exemplary embodiments of the present invention, the fractal dimension value may be set up as [2−{log (sum of changes in chrominance information per pixel (A (η)))/log (inclination of average value (η) of crosswise width and lengthwise width of a horizontal surface of the pixel)}].

In still another general aspect of the present invention, a medium readable by using a computer, recording a program executing a continuous auto focus adjusting method, is provided, the method characterized by comprising: generating a fractal dimension value indicating changes of pixels of video images; determining whether the fractal dimension value generated in the course of generating the fractal dimension exceeds a preset threshold value; and performing a focus determining mode to determine a focus if the fractal dimension value exceeds the preset threshold value.

Advantageous Effects

The image pickup apparatus having auto focusing function using fractal dimension and an auto focusing method of an image pickup apparatus according to the present invention have advantageous effects in that a video image which is an auto focusing adjustment object can be precisely discriminated by using fractal dimension value indicating changes of chrominance information of a pixel.

There is no occurrence of time delay because the video image of auto focusing adjustment object is determined simply by using a fractal dimension value without consideration of time delay problem by the precise detection of the video image of auto focusing adjustment object. Furthermore, a frequent auto focusing performance caused by images changed by occurrence of time delay can be prevented by the precise detection of the video image of auto focusing adjustment object.

BEST MODE

Figure 1:
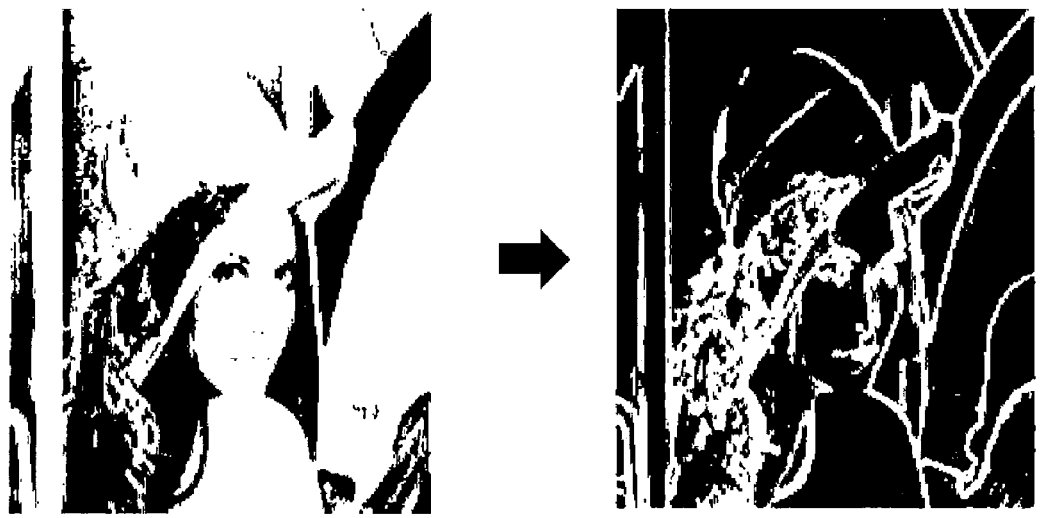
FIG. 1 illustrates video images under a focus determining mode and video images having passed an edge filter according to prior art.

Now, an image pickup apparatus having auto focusing function using fractal dimension and an auto focusing method of an image pickup apparatus according to the present invention will be described in detail with reference to the accompanying drawings. The disclosed embodiments and advantages thereof are best understood by referring to FIGS. 1-5 of the drawings.

Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

In describing the present invention, detailed descriptions of constructions, configurations or processes known in the art may be omitted to avoid obscuring appreciation of the invention by a person of ordinary skill in the art with unnecessary detail regarding such known constructions and functions. In the drawings, the size and relative sizes of each element may be exaggerated for clarity and are not applied to practical applications.

Like reference numerals in the drawings denote like elements. It will be understood that when an element such as a layer, film, region, or substrate is referred to as being "on" or "under" another element, it can be directly on, or directly connected to the other element, or intervening elements may be present. The "on" or "under" of each element is based on the drawings. Also, "exemplary" is merely meant to mean an example, rather than the best.

Figure 2:
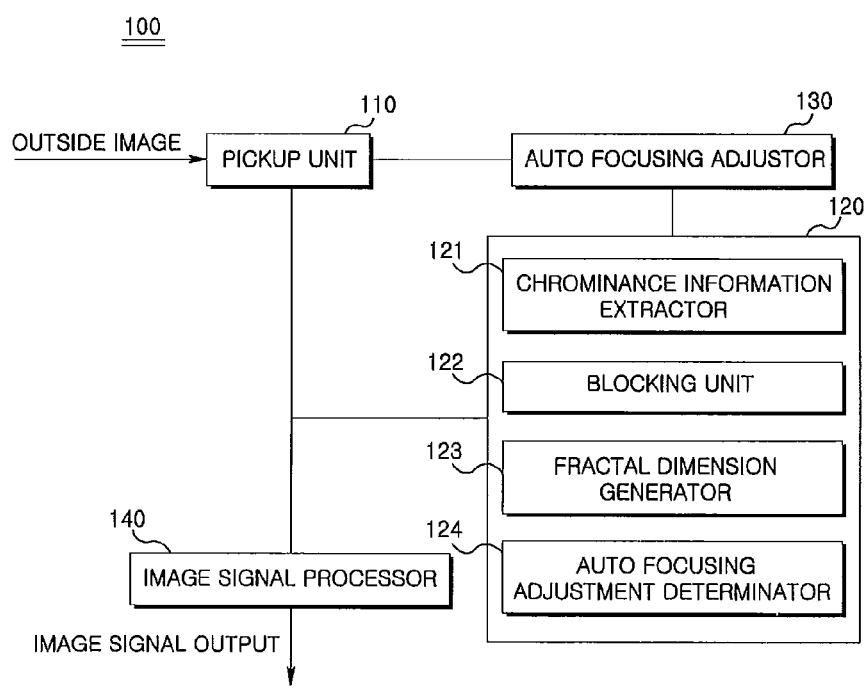
FIG. 2 is a block diagram illustrating an image pickup apparatus according to an exemplary embodiment of the present invention.
Figure 3:
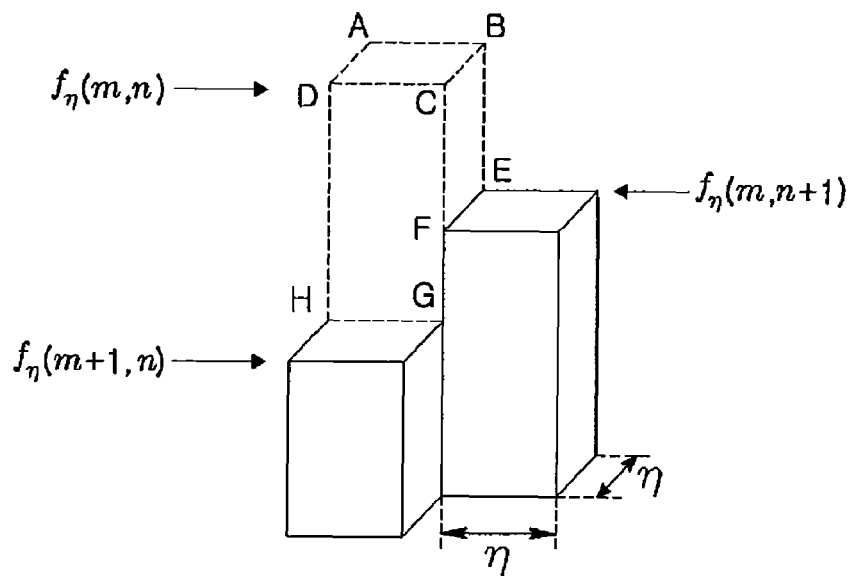
FIG. 3 is a schematic view illustrating a pixel histogram that shows chrominance information of a pixel.
Figure 4:
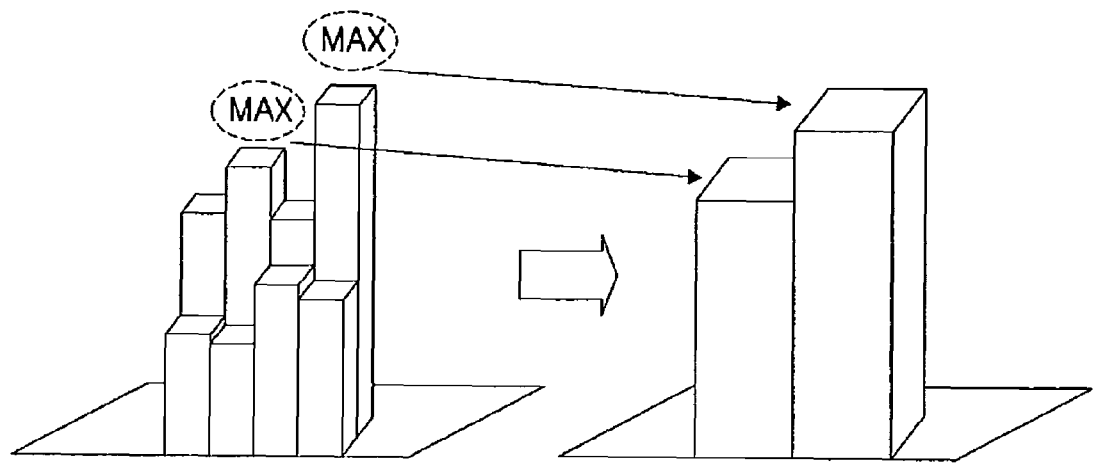
FIG. 4 is a schematic view illustrating pixels blocked by a blocking unit.

FIG. 2 is a block diagram illustrating an image pickup apparatus according to an exemplary embodiment of the present invention, FIG. 3 is a schematic view illustrating a pixel histogram that shows chrominance information of a pixel, and FIG. 4 is a schematic view illustrating pixels blocked by a blocking unit.

Referring to FIG. 2, an image pickup apparatus (100) may include a pickup unit (110), a fractal controller (120), an auto focusing adjustor (130) and an image signal processor (140).

The pickup unit (110) may be formed with a camera including a dual camera and an infrared depth camera, a plurality of 2D cameras and a plurality of 3D image cameras. The pickup unit (110) may generate chrominance information of each pixel for expressing an image in an object area and output the chrominance information to the image signal processor (140) and the fractal controller (120).

The fractal controller (120) may include a chrominance information extractor (121), a blocking unit (122), a fractal dimension generator (123) and an auto focusing adjustment determinator (124). The chrominance information extractor (121) may extract chrominance information of each pixel of a video image of the pickup unit (110) and output the information to a histogram data that indicates pixel chrominance information. The chrominance information per pixel may be expressed as shown in a histogram of FIG. 3.

The blocking unit (122) may block the pixels having chrominance information extracted by the chrominance information extractor (121) by a block including an N*N pixel and determine a chrominance information value having a highest value among the blocks as a chrominance value of the block and re-set up the block as a new pixel. That is, the blocking unit (122) can quickly determine whether to adjust the auto focusing by grouping the pixels into blocks and by reducing calculation of difference in surface area on chrominance information graph of pixels. FIG. 4 illustrates a plurality of initial pixels being transformed to blocked pixels by the blocking unit (122).

The fractal dimension generator (123) may generate a fractal dimension value indicating changes in chrominance difference among the neighboring pixels of blocked pixels in the chrominance information extractor (121) or the blocking unit (122). At this time, the fractal dimension value may be calculated by a value of a sum of changes in surface area among pixels of histogram indicating the pixels.

The value [A (η)] of a sum of changes in surface area of histogram corresponding to each pixel on the pixel histogram indicating changes in chrominance information of each pixel, as illustrated in FIG. 3, may be expressed by the following Equation 1, where horizontal and vertical lengths are expressed by η, a height is expressed by fη (m, n), m defines the number of a pixel row that increases to a direction coming from ground surface in a vertical direction, and n defines the number of pixel row that increases to a horizontal direction.

$$A(\eta) = \sum_{m=0}^{N-1}\sum_{n=0}^{N-1} \eta^2 + \sum_{m=0}^{N-1}\sum_{n=0}^{N-1} \eta[|f_\eta(m, n) - f_\eta(m, n+1)| + |f_\eta(m, n) - f_\eta(m+1, n)|] + \sum_{m=0}^{N-2} \eta|f_\eta(m, N-1) - f_\eta(m+1, N-1)| + \sum_{n=0}^{N-2} \eta|f_\eta(N-1, n) - f_\eta(N-1, n+1)|$$ [Equation 1]

where a first term defines a sum of an area on an upper surface (a total sum of upper areas expressed by ABCD), a second term defines a sum of areas of right surfaces (BCFE) and front surfaces (CDHG) of pixel histogram, a third term defines a sum of front areas of pixel histograms positioned at an extreme right row, and a fourth term defines a sum of areas of right side surfaces of pixel histograms positioned at an extreme front pixel row.

Furthermore, a result of the sums may be expressed by the following Equation 2.

$$A(\eta) = C_\eta^{2-D}$$ [Equation 2]

where D defines a dimension, C defines a constant, which may be derived from an inclination of a logarithmic function as expressed in the following Equation 3.

The Equation 2 represents all the geometric areas. Since the Equation 2 is derived by Benoit B. Mendelbrot, the detailed explanation of which is omitted. Logarithm of Equation 2 enables to obtain the Equation 3 that indicates a fractal dimension value.

$$FD = 2 - |\log(A(\eta))/\log(\eta)|, \text{ (in case of 2D image, } 2 \leq FD < 3)$$ [Equation 3]

The fractal dimension value (FD) may be set up as [2−{log (sum of changes in chrominance information per pixel (A (η)))/log (inclination of average value (η) of horizontal and vertical widths of a horizontal surface of the pixel)}], whereby the fractal dimension value comes to have a decimal value equal to or greater than 2 but smaller than 3.

The auto focusing adjustment determinator (124) may compare the fractal dimension value (FD) generated by the fractal dimension generator (123) with a pre-set threshold value, and output an auto focusing adjustment performance signal to the auto focusing adjustor (130), if the fractal dimension value (FD) is equal to or greater than the pre-set threshold value, and keep performing the monitoring mode discriminating whether to perform the auto focusing if the fractal dimension value (FD) is smaller than the pre-set threshold value.

The auto focusing adjustor (130) may enter the focus determining mode in response to the auto focusing adjustment performance signal of the auto focusing adjustment determinator (124) to perform the auto focusing adjustment to the pickup unit (110).

The image signal processor (140) may process a depth map generation of video image inputted from the pickup unit (110), noise removal and a video image correction to generate a video image signal in which quality is maintained at the highest level and output the signal to an outside apparatus.

The fractal controller (120) may be integrally formed with the image signal processor (140), where the chrominance information extraction and the blocking may be performed by the image signal processor (140), while the fractal controller (120) may be formed with a fractal dimension generator (123) and the auto focusing adjustment determinator (124) to perform the processes of fractal dimension generation, fractal dimension value generation and auto focusing adjustment determination.

Mode for Invention

Figure 5:
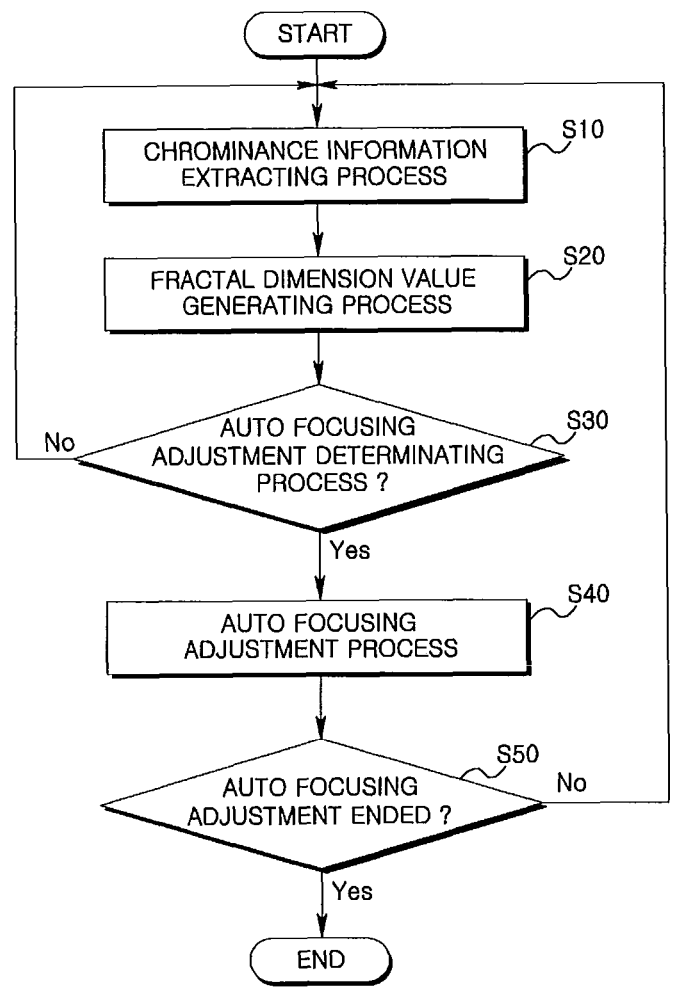
FIG. 5 is a flowchart illustrating a process of an auto focusing method according to an exemplary embodiment of the present invention.

FIG. 5 is a flowchart illustrating a process of an auto focusing method according to an exemplary embodiment of the present invention.

Referring to FIGS. 2 through 5, a process of an auto focusing method applied to the image pickup apparatus (100) of FIG. 2 will be described.

The image pickup unit (110) of FIG. 2, as described in the explanation of the prior art, maintains the monitoring mode for determining whether to perform the auto focusing during capturing is being progressed.

Under the monitoring mode, in a case a video image signal captured by the image pickup unit (110) is outputted, chrominance information of outputted video image signals is extracted to generate as a histogram data (S10; chrominance information extraction process).

The histogram data generated in the chrominance information extraction process (S10) is expressed in a 3-axis histogram indicated in 3-axis coordinator. However, various other display methods may be applicable.

In a case the image signal processor (140) is integrally formed with the fractal controller (120), the histogram data may be generated by the image signal processor (140), and in a case the image signal processor (140) is separately formed from the fractal controller (120), the histogram data may be generated by the chrominance information extractor (121) or the image signal processor (140).

Furthermore, the chrominance information extracting process (S10) may further perform processes of blocking pixels having chrominance information extracted for quickly performing the auto focusing adjustment determination as a block including a N*N pixel, determining a chrominance information value having a highest value in the blocks as a chrominance value of the block and setting up the block as a new pixel. The pixels formed as blocks by the blocking process are shown in FIG. 4.

In a case the chrominance information is extracted by the chrominance information extracting process (S10) or by the blocking process, the fractal dimension generator (123) generates a fractal dimension value indicating changes of chrominance information among pixels generated in the chrominance information extracting process (S10) (S20; fractal dimension value generating process). At this time, the pixels are such that the changes in surface area of Equation 2 are calculated by Equation 1 using pixels before or after the blocking process, and logarithm of Equation 2 enables to obtain the Equation 3 that indicates the fractal dimension value.

The thus-obtained fractal dimension value that has a characteristic expounded in FIGS. 2, 3 and 4, may be expressed in a decimal value equal to or greater than 2 but smaller than 3, which shows complexity of changes in video images.

In a case the fractal dimension value is obtained by the fractal dimension value generating process (S20), the auto focusing adjustment determinator (124) may compare the pre-set threshold value with the fractal dimension value to determine whether to perform the auto focusing adjustment (S30; auto focusing adjustment determinating process).

As a result of the auto focusing adjustment determinating process (S30), if the fractal dimension value is smaller than (may be set up as being smaller than or equal to) the threshold value, it is determined that changes in video images are not great, and flow returns to the chrominance information extraction process (S10) to maintain the monitoring mode state. This case corresponds to a case where a shape of a person is changed, without any change to the backdrop of the object.

Conversely, as a result of the auto focusing adjustment determinating process (S30), if the fractal dimension value is greater than or equal to the threshold value (may be set up as being greater than the threshold value), the monitoring mode is ended and flow is changed to the focus determining mode to perform the auto focusing adjustment. To this end, the auto focusing adjustment determinator (124) may output an auto focusing adjustment signal to the auto focusing adjustor (130).

The auto focusing adjustor (130) may perform the auto focusing adjustment in response to the auto focusing adjustment signal to newly fix a focus of the image pickup unit (110) (S40. auto focusing adjustment process). This case may be a state where all things including the person and backdrop are changed.

Successively, in a case the image capturing is finished, the performance of auto focusing adjustment is finished, and in a case the video capturing is being continued, flow returns to the chrominance information extracting process (S10) to repeatedly perform the continuous auto focusing process (S50).

INDUSTRIAL APPLICABILITY

The image pickup apparatus having auto focusing function using fractal dimension and an auto focusing method of an image pickup apparatus according to the present invention have industrial applicability in that a video image which is an auto focusing adjustment object can be precisely discriminated.

There is no occurrence of time delay because the video image of auto focusing adjustment object is determined simply by using a fractal dimension value without consideration of time delay problem by the precise detection of the video image of auto focusing adjustment object. Furthermore, a frequent auto focusing performance caused by images changed by occurrence of time delay can be prevented by the precise detection of the video image of auto focusing adjustment object.

Although the present invention has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An image pickup apparatus having a continuous auto focusing function using fractal dimension, the apparatus comprising:
   a pickup unit configured to pick-up an image;
   a fractal controller configured to:
      generate a fractal dimension indicating chrominance information change per pixel of the image, and
      determine whether an auto focusing is to be adjusted; and
   an auto focusing adjustor configured to adjust a focus of the pickup unit in response to an auto focus adjustment signal from the fractal controller,
   wherein the fractal dimension is set up as [2−{log (sum of changes in chrominance information per pixel ($A(\eta)$))/ log (inclination of average value ($\eta$) of horizontal and vertical widths of a horizontal surface of the pixel)}].

2. The apparatus of claim 1, wherein the fractal controller comprises:
   a chrominance information extractor configured to extract the chrominance information per pixel of the image,
   a fractal dimension generator configured to generate the fractal dimension indicating changes in chrominance difference among the neighboring pixels, and
   an auto focusing adjustment determinator configured to generate the auto focus adjustment signal and output the signal to the auto focusing adjustor if the fractal dimension exceeds a preset threshold value.

3. The apparatus of claim 2, wherein the fractal controller further comprises:
a blocking unit configured to block the pixels by a block including an N*N pixel determine the chrominance information having the highest value in the blocks as a chrominance of the block, and set up the block as a new pixel.

4. The apparatus of claim 1, wherein the fractal dimension is a value of a sum of surface changes among pixels of histogram indicating the pixel.

5. The apparatus of claim 1, wherein the fractal dimension has a decimal value that is equal to or greater than 2 but smaller than 3.

6. An auto focusing method of an image pickup apparatus, the method comprising:
extracting chrominance information per pixel of an image;
generating a fractal dimension indicating changes of the chrominance information;
determining whether the fractal dimension exceeds a preset threshold value; and
determining a focus if the fractal dimension value exceeds a preset threshold value,
wherein the fractal dimension is set up as [2−{log (sum of changes in chrominance information per pixel (A (η)))/log (inclination of average value (η) of horizontal and vertical widths of a horizontal surface of the pixel)}].

7. The method of claim 6, wherein generating the fractal dimension comprises detecting complexity indicating chrominance changes among neighboring pixels.

8. The method of claim 6, further comprising:
blocking pixels having chrominance information as a block including a N*N pixel;
determining the chrominance information having the highest value in the blocks as a chrominance of the block; and
setting up the block as a new pixel.

9. The method of claim 6, wherein extracting the chrominance information includes indicating the chrominance information per pixel in a 3-axis histogram.

10. The method of claim 9, wherein the fractal dimension is a value of a sum of surface changes among pixels of histogram indicating the pixel.

11. The method of claim 6, wherein the fractal dimension has a decimal value that is equal to or greater than 2 but smaller than 3.

* * * * *